(No Model.)

P. W. GATES.
SEALING, LUBRICATING, AND BEARING SUPPORT FOR GYRATING SCREENS, &c.

No. 525,411. Patented Sept. 4, 1894.

Witnesses
Severance
W. Harvey Muzzy

Inventor
Philetus W. Gates
by his Attorney
Mason Fenwick Lawrence
Attorney

THE NORRIS PETERS CO., PHOTO-LITHO., WASHINGTON, D. C.

UNITED STATES PATENT OFFICE.

PHILETUS WARREN GATES, OF CHICAGO, ILLINOIS, ASSIGNOR TO THE GATES IRON WORKS, OF SAME PLACE.

SEALING, LUBRICATING, AND BEARING SUPPORT FOR GYRATING SCREENS, &c.

SPECIFICATION forming part of Letters Patent No. 525,411, dated September 4, 1894.

Application filed November 10, 1893. Serial No. 490,568. (No model.)

*To all whom it may concern:*

Be it known that I, PHILETUS WARREN GATES, a citizen of the United States, residing at Chicago, in the county of Cook and State of Illinois, have invented certain new and useful Improvements in Sealing, Lubricating, and Bearing Supports for Gyrating Screens and Like Devices; and I do hereby declare the following to be a full, clear, and exact description of the invention, such as will enable others skilled in the art to which it appertains to make and use the same.

My invention relates to supports or gyrating bearings, for screens, tables or other analogous devices; and it consists in a novel combination of one or more seating and dust sealing plates, an upright gyrating bearing block, and a base portion constructed with a seat for said gyrating block, and with chambers for holding lubricant and a sealing fluid, whereby the columnar bearing block is allowed to make a gyratory movement, and is lubricated by a bath of oil, and sealed with water or other suitable fluid, against the entrance of coal, stone and other dust, and undue wear from the presence of such substances in the bearing chamber is thus avoided.

It also consists of certain details of construction and minor combinations as will be hereinafter described.

Figure 1:
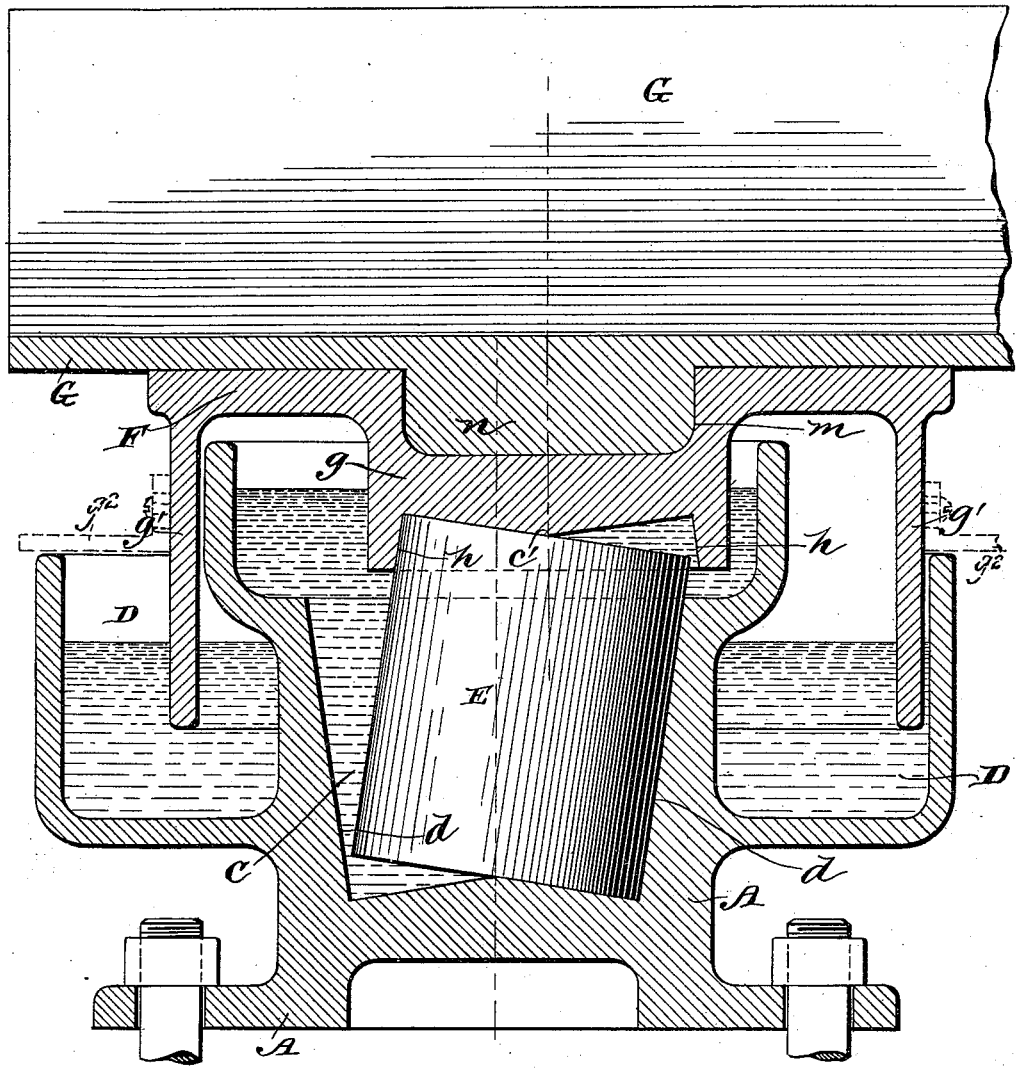
Figure 2:
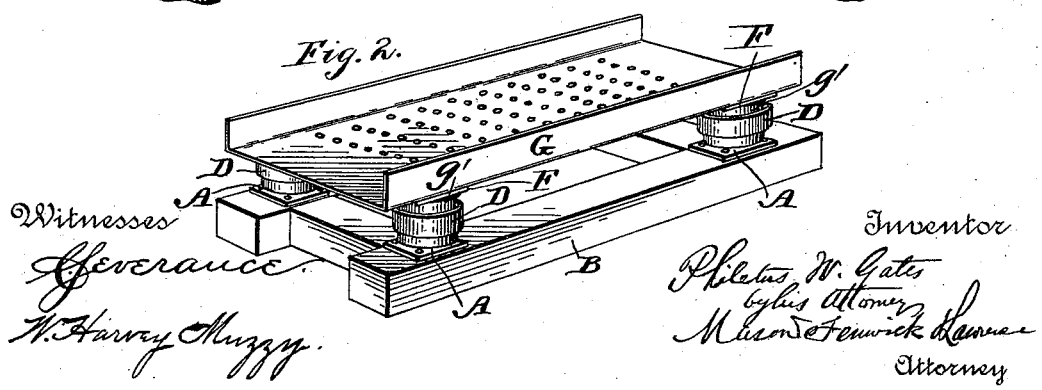

In the accompanying drawings, Figure 1. is a vertical section showing my improved lubricating and water or other fluid sealed bearing, and Fig. 2. is a perspective view on a reduced scale, showing a screen mounted upon four of my improved bearings.

A in the drawings is a supporting base portion adapted to be secured by bolts, to a timber frame B, or to other suitable structure. This base portion is formed with an upwardly flared circular bearing chamber C having its inner, or upper surface constructed with an incline; said incline being downward and outward from a central apex; it gradually descending and uniting with the inclined wall $d$ of the bearing chamber. The bearing chamber at the upper termination of its inclined wall is enlarged laterally, and this enlarged portion has its wall extended up vertically. Outside the bearing chamber, another chamber D of considerably greater diameter is provided, but its wall does not necessarily extend up as high as the wall of the bearing chamber. In the bearing chamber C, oil or other suitable lubricant is placed so as to fill it nearly to its top and thus form a bath for a columnar bearing block E, which will be hereinafter described; and in the chamber D, water, glycerine or other suitable fluid is placed, to serve as a means for sealing the bearing chamber against entrance of dust.

F are plates of metal or other material to which a screen G or other device requiring a gyratory movement, is applied. Each of these plates is formed with a downwardly extending circular projection $g$ at its center, on the under side; and in the lower end of this projection is formed a bearing seat having its bottom inclined downward toward a central apex $c'$; said bottom ascending from the central apex on a gradual incline until it unites with the downwardly flared wall $h$ which incloses the said bearing seat. This upper bearing seat corresponds exactly with the lower bearing seat, except that its apex is some distance out of the central vertical line of the apex of the lower bearing seat. Outside the projection $g$, a circular skirting or flange $g'$ is formed, the same being of sufficient depth to extend a considerable distance into the outer chamber D of the base portion A, and thus have its lower edge immersed in the sealing fluid which is placed in the chamber. In the center of each of the plates, on top, a cavity $m$ is formed to receive a boss $n$ of the screen or other device which is to be attached to the plates. Between each pair of the top and bottom plates a columnar bearing, E having straight sides and flat ends, is applied, so as in its gyrations to find seats against the inclined bottoms of the bearing seats, also continuous bearings against the inclined walls of the bearing chambers, as illustrated in the drawings.

From the preceding description and the accompanying drawings, it will be seen that with the simplest construction of parts, and while the necessary gyratory movement is secured, and the most effective bearings at the top and bottom of the columnar bearing block are afforded, the lubricant holding and bearing chamber with contents is sealed against dust.

I make no claim to the construction of the columnar gyrating bearing and seats with inclined bottoms, when the same are not combined with a supporting and sealing plate and with a bearing chamber, and sealing chamber adapted to contain a bath of oil and a sealing fluid, as such columnar bearing having upper and lower inclined seats, is the invention of Charles L. Carman.

It will be understood that my invention as herein described is not necessarily confined, (although best adapted therefor) to the special construction of the columnar bearing block and the special seats therefor, constructed as shown, it being applicable to many descriptions of upright columnar gyrating bearings.

It is contemplated to provide the plate F with a horizontal flange $g^2$ as indicated by dotted lines, for the purpose of preventing the dust falling down into the sealing fluid; this flange would be attached to the flange $g'$; and it might be made adjustable up and down by means of slots and set screws.

What I claim as my invention is—

1. The combination of one or more connecting and supporting plates each having a dust sealing flange, and an upper seat for a gyrating bearing, a base portion constructed with a chamber for holding a sealing fluid, and a lubricant holding and bearing chamber having a lower seat for a gyrating bearing, substantially as and for the purpose set forth.

2. The combination of the upwardly flared bearing chamber having a seat for a gyrating bearing, and an enlarging upward extension, with a plate having an upper seat for a gyrating bearing, said seat being formed in a downwardly extended projection which is laterally inclosed or surrounded by the upper extension of the bearing chamber, substantially as described.

3. The combination of a gyrating screening device attached to supporting and sealing plates forming upper seats for gyrating bearings, base-supporting-portions forming lower seats for the gyrating bearings and a bearing and oil bath-lubricating chamber, substantially as described.

In testimony whereof I hereunto affix my signature in presence of two witnesses.

PHILETUS WARREN GATES.

Witnesses:
A. J. GATES,
C. L. CARMAN.